UNITED STATES PATENT OFFICE.

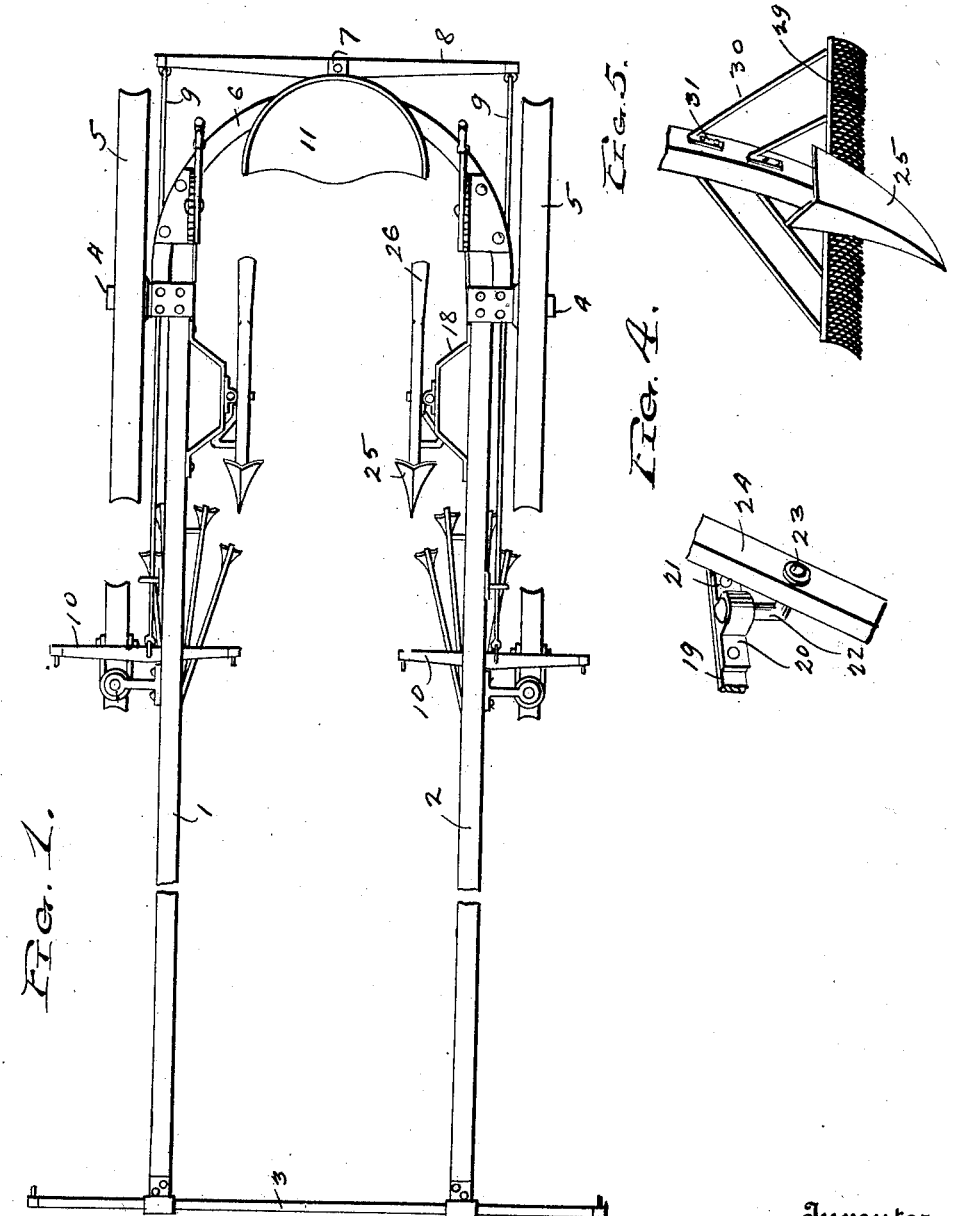

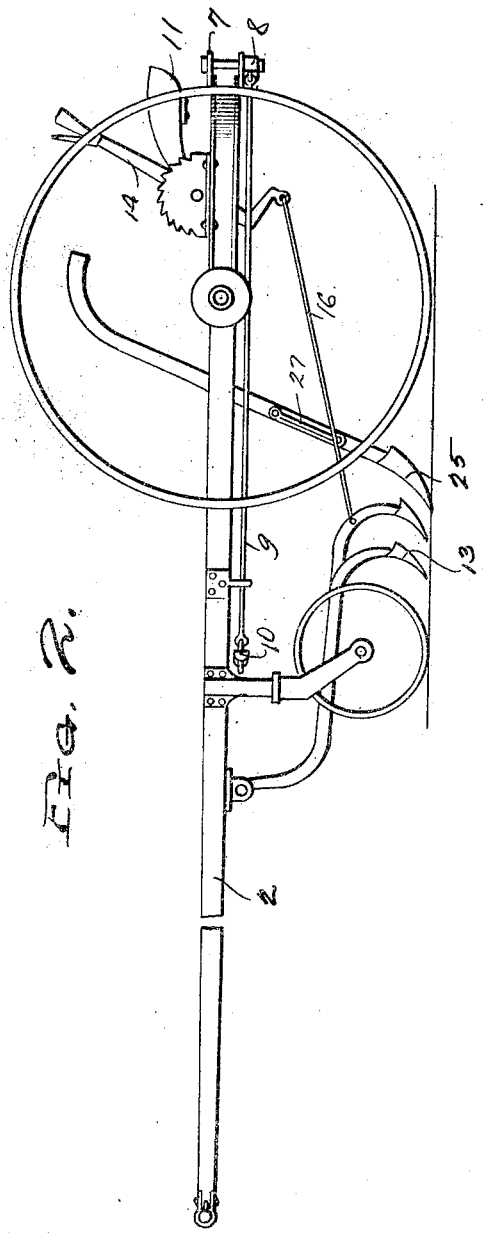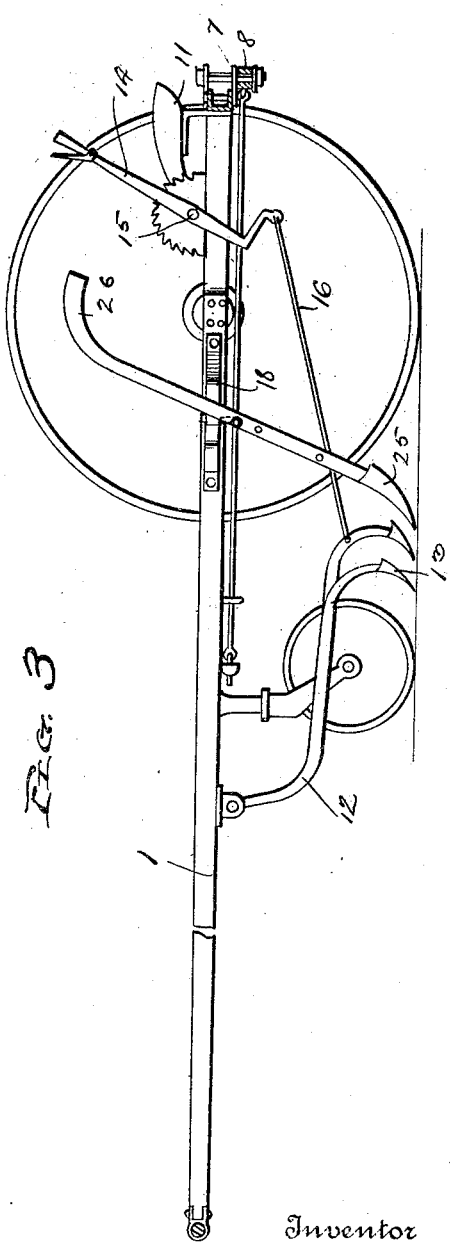

JOHN W. BIDWELL, OF HOUSTON, MINNESOTA.

CULTIVATOR.

1,368,385.  Specification of Letters Patent.  Patented Feb. 15, 1921.

Application filed June 23, 1919. Serial No. 305,945.

*To all whom it may concern:*

Be it known that I, JOHN W. BIDWELL, a citizen of the United States, residing at Houston, in the county of Houston and State of Minnesota, have invented certain new and useful Improvements in Cultivators, of which the following is a specification.

This invention relates to cultivator machines and the primary object of the invention is to provide an apparatus which may be operated to cultivate growing plants.

One of the objects of the invention is to provide a cultivator having gang cultivators and separately mounted auxiliary cultivators, the latter being mounted for movement in varying directions so that the operator may control the movement of the auxiliary cultivators.

A further object of the invention is to provide an apparatus of this character which may be readily controlled by the operator and which will be arranged so that the operator may easily observe the ground over which the device is traveling so that the position of the cultivator blades may be governed accordingly.

A further object of this invention is to provide a device of this character which consists of comparatively few parts but is simple in construction, but durable and well adapted to withstand the rough usage to which devices of this character are ordinarily subjected.

For a full description of the invention and the advantages and merits thereof, reference is to be had to the following description and accompanying drawings, in which:—

Figure 1 is a plan view of the apparatus constructed in accordance with my invention.

Fig. 2 is a side elevation of the same,

Fig. 3 is a longitudinal central section,

Fig. 4 is a detail perspective view of a part of the apparatus, and

Fig. 5 is a view of an attachment which may be used in connection with the adjustable cultivator blades to protect the growing plants.

Referring to the drawings, wherein is illustrated the preferred form of my invention, in which like numerals of reference indicate like or corresponding parts throughout the several views, the draft tongues 1 and 2 are arranged in parallel relation and have connected to their forward ends, the breast pole 3 which may be connected to the usual harness yoke whereby draft animals may be harnessed to the tongues. In this connection it will be understood that the apparatus will be equally as well adapted for power machines and tractors and is not limited to draft animals.

A semi-circular frame 6 is secured to the rear ends of the tongues 1 and 2 and has extending laterally therefrom, pintles 4 upon which wheels 5 are journaled. A clevis 7 is carried by and extends rearwardly from the frame to support an evener consisting of the usual body 8 and rods 9. The ends of the body 8 extend slightly beyond the tongues 1 and 2 so that the rods 9 will be outside of the latter. Attached to the forward end of each evener rod 9 is a doubletree 10 to which swingletrees are adapted to be attached in the usual way. An operator's seat 11 is arranged above the frame 6 and secured thereto approximately midway between the sides of the frame.

Attached to each tongue 1 and 2 is a beam 12 to which is secured the draft bars of a plurality of cultivator blades 13. The cultivator blades, therefore, are disposed in separate gangs at opposite sides of the apparatus and substantially beneath the tongues 1 and 2. These gangs operate in the usual manner and do not change their relative positions toward or away from each other. Each gang, however, may be lifted out of the ground or be permitted to remain in engagement therewith, by a controlling lever 14 which is pivotally mounted as indicated at 15 and is equipped with a rod 16 which is joined to one of the cultivator bars as shown in Figs. 2 and 3. By actuating either of the levers 14, the corresponding gang of cultivator blades may be raised or lowered.

Attached to each tongue, on the inside thereof, is a bracket 18 which is equipped with a pivot member shown in detail in Fig. 4. As shown, the bracket is offset so that the attaching plate 19 is disposed considerably within the space between the tongues 1 and 2. Attached to each plate 19 is a bearing 20 within which is pivotally mounted a pivot member 22, the same being disposed vertically. This pivot member 22 is equipped with a horizontally disposed portion 23 which forms the horizontal pivot for the standard 24 which carries a cultivator blade 25 at its lower end and is equipped at its upper end with a handle 26. Below the pivot member 23, the standard is provided with a stirrup 27 disposed to be engaged by one of the feet of the person operating the apparatus. It will be noted, by virtue of the pivotal construction shown in Fig. 4 that the standard 24 may be either swung vertically or laterally by virtue of the positions of the pivot members 22 and 23. By swinging the standard on the member 23, the cultivator blade may be raised out of engagement with the ground, or may be forced into the ground for the desired depth. By laterally swinging the standard on the member 22, the position of the two blades 25, with respect to each other, may be governed and the ground engaged by the blades may be cultivated in close proximity to the growing plant. Inasmuch as the two auxiliary cultivator members are spaced apart and no structure intervenes between the two it will be readily apparent that the operator may easily observe the ground between the cultivator members so that by moving his feet disposed in the stirrup 27, the positions of the blades 25 may be readily controlled and the ground may be properly cultivated.

In Fig. 5 I have illustrated an attachment for the standard 24 which consists of a screen member 29 disposed behind the cultivator blades 25 and equipped with fastening members 30 which are secured, as indicated at 31, to the standard so that the screen may be disposed in a position to protect the growing plants when the apparatus is in use.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claim.

Having thus fully described my invention what I claim as new and desire to secure by Letters Patent, is:—

A cultivator comprising a U-shaped frame, wheels thereon, a seat at the rear of the frame, cultivator gangs pivoted to the sides, inwardly extending brackets to the rear of the gangs, a member formed with a lateral extension, pivotally mounted in each of said brackets, a standard pivotally mounted on each extension, a cultivator blade on each standard, and a hand hold at the upper end of each standard, extending in proximity to the seat.

In testimony whereof I affix my signature in presence of two witnesses.

JOHN W. BIDWELL.

Witnesses:
A. P. ISMODT,
PALMER G. JOHNSON.